US009405780B2

(12) United States Patent
Ursal et al.

(10) Patent No.: US 9,405,780 B2
(45) Date of Patent: Aug. 2, 2016

(54) SYSTEM AND METHOD FOR PROVIDING A GLOBAL UNIVERSAL SEARCH BOX FOR THE USE WITH AN ENTERPRISE CRAWL AND SEARCH FRAMEWORK

(71) Applicant: Oracle International Corporation, Redwood Shores, CA (US)

(72) Inventors: D J Vasant Ursal, Austin, TX (US); Sherry Mead, San Francisco, CA (US); Linda Bao, Bellingham, WA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 0 days.

(21) Appl. No.: 13/733,050

(22) Filed: Jan. 2, 2013

(65) Prior Publication Data

US 2013/0238662 A1    Sep. 12, 2013

Related U.S. Application Data

(60) Provisional application No. 61/609,644, filed on Mar. 12, 2012, provisional application No. 61/609,684, filed on Mar. 12, 2012, provisional application No. 61/609,698, filed on Mar. 12, 2012, provisional application No. 61/621,405, filed on Apr. 6, 2012, provisional application No. 61/659,843, filed on Jun. 14, 2012, provisional application No. 61/659,877, filed on Jun. 14, 2012.

(51) Int. Cl.
*G06F 17/30* (2006.01)
*G06F 21/60* (2013.01)
(Continued)

(52) U.S. Cl.
CPC ...... *G06F 17/30318* (2013.01); *G06F 17/3087* (2013.01); *G06F 17/30289* (2013.01); *G06F 17/30607* (2013.01); *G06F 17/30864* (2013.01); *G06F 21/604* (2013.01); *G06F 21/6227* (2013.01); *G06F 21/6236* (2013.01); *H04L 63/101* (2013.01); *H04L 63/20* (2013.01); *G06F 2221/2119* (2013.01); *G06F 2221/2141* (2013.01)

(58) Field of Classification Search
CPC ................................ G06F 17/30864
USPC .................................. 707/709, 792
See application file for complete search history.

(56) References Cited

U.S. PATENT DOCUMENTS 6,609,123 B1    8/2003    Cazemier
7,376,953 B2    5/2008    Togasaki
(Continued)

FOREIGN PATENT DOCUMENTS

EP        2270725        1/2011

*Primary Examiner* — Cam-Linh Nguyen
(74) *Attorney, Agent, or Firm* — Tucker Ellis LLP

(57) ABSTRACT

Described herein are systems and methods for providing an enterprise crawl and search framework, including features such as use with middleware and enterprise application environments, pluggable security, search development tools, user interfaces, and governance. The system includes an enterprise crawl and search framework which abstracts an underlying search engine, provides a common set of APIs for developing search functionalities, and allows the framework to serve as an integration layer between one or more enterprise search engines and one or more enterprise applications. A computing environment can be used to display a global universal search box. A user can input search queries into the search box, which are then executed against crawled and/or searched data provided by the framework, and results, in the form of data represented by those searchable objects to which the user has entitlement to view, are returned dynamically, to update the contents of the search box.

15 Claims, 5 Drawing Sheets

(51) Int. Cl.
*G06F 21/62* (2013.01)
*H04L 29/06* (2006.01)

(56) References Cited

U.S. PATENT DOCUMENTS

| | | | |
|---|---|---|---|
| 7,523,471 B1* | 4/2009 | Dorn | G06F 9/44 709/227 |
| 7,689,580 B2* | 3/2010 | Wang et al. | 707/999.102 |
| 7,693,897 B2 | 4/2010 | Bugir | |
| 7,720,971 B2 | 5/2010 | Moutafov | |
| 7,769,752 B1* | 8/2010 | Turner et al. | 707/731 |
| 7,953,861 B2 | 5/2011 | Yardley | |
| 7,966,369 B1* | 6/2011 | Briere | G06Q 10/10 707/616 |
| 8,056,091 B2* | 11/2011 | Brunswig | G06F 9/54 719/315 |
| 8,176,083 B2 | 5/2012 | Vossen | |
| 8,209,307 B2 | 6/2012 | Erofeev | |
| 8,266,150 B1 | 9/2012 | Lin | |
| 8,312,439 B2 | 11/2012 | Kielstra et al. | |
| 8,621,085 B2 | 12/2013 | Trost | |
| 9,280,676 B2* | 3/2016 | Said | G06F 8/20 |
| 2001/0034733 A1 | 10/2001 | Prompt | |
| 2002/0107957 A1 | 8/2002 | Zargham | |
| 2003/0217034 A1 | 11/2003 | Shutt | |
| 2004/0064447 A1* | 4/2004 | Simske | G06F 17/30684 |
| 2005/0027796 A1 | 2/2005 | San Andres | |
| 2005/0149496 A1 | 7/2005 | Mukherjee et al. | |
| 2006/0112130 A1* | 5/2006 | Lowson | G06Q 30/00 |
| 2006/0200556 A1 | 9/2006 | Brave et al. | |
| 2006/0277166 A1 | 12/2006 | Vogler-Ivashchanka | |
| 2007/0016604 A1 | 1/2007 | Murthy et al. | |
| 2007/0118693 A1 | 5/2007 | Brannon et al. | |
| 2007/0130112 A1* | 6/2007 | Lin | G06F 17/3002 |
| 2007/0130126 A1* | 6/2007 | Lucovsky et al. | 707/3 |
| 2007/0208744 A1* | 9/2007 | Krishnaprasad et al. | 707/9 |
| 2007/0226242 A1 | 9/2007 | Wang | |
| 2007/0266384 A1* | 11/2007 | Labrou et al. | 718/100 |
| 2007/0271584 A1 | 11/2007 | Anderson et al. | |
| 2007/0277110 A1* | 11/2007 | Rogers et al. | 715/736 |
| 2008/0082573 A1 | 4/2008 | Fish | |
| 2008/0114628 A1 | 5/2008 | Johnson | |
| 2008/0263462 A1* | 10/2008 | Mayer-Ullmann et al. | 715/762 |
| 2008/0275844 A1* | 11/2008 | Buzsaki et al. | 707/3 |
| 2008/0281824 A1 | 11/2008 | Rangadass | |
| 2008/0301562 A1* | 12/2008 | Berger | G06F 17/3089 715/733 |
| 2009/0106207 A1 | 4/2009 | Solheim | |
| 2009/0112844 A1* | 4/2009 | Oro | G06F 17/30864 |
| 2009/0222465 A1 | 9/2009 | Bernard | |
| 2010/0114947 A1* | 5/2010 | Eftekhari | G06F 17/3089 707/770 |
| 2010/0205160 A1 | 8/2010 | Kumar | |
| 2010/0319067 A1 | 12/2010 | Mohanty et al. | |
| 2010/0325569 A1 | 12/2010 | King et al. | |
| 2011/0077936 A1 | 3/2011 | Arumugam | |
| 2011/0125764 A1* | 5/2011 | Carmel et al. | 707/749 |
| 2011/0191312 A1 | 8/2011 | Gutlapalli et al. | |
| 2011/0258199 A1 | 10/2011 | Oliver | |
| 2011/0270820 A1 | 11/2011 | Agarwal | |
| 2012/0259927 A1* | 10/2012 | Lockhart | H04L 12/5845 709/206 |
| 2013/0061174 A1 | 3/2013 | Buchanan | |
| 2013/0073536 A1 | 3/2013 | Fedorynski | |
| 2013/0073570 A1* | 3/2013 | Joshi et al. | 707/754 |

* cited by examiner

SYSTEM AND METHOD FOR PROVIDING A GLOBAL UNIVERSAL SEARCH BOX FOR THE USE WITH AN ENTERPRISE CRAWL AND SEARCH FRAMEWORK

CLAIM OF PRIORITY

This application claims the benefit of priority to U.S. Provisional Patent Application No. 61/609,644, titled "SYSTEM AND METHOD FOR PROVIDING AN ENTERPRISE CRAWL AND SEARCH FRAMEWORK", filed Mar. 12, 2012; U.S. Provisional Patent Application No. 61/609,684, titled "SYSTEM AND METHOD FOR PROVIDING AN ENTERPRISE CRAWL AND SEARCH FRAMEWORK", filed Mar. 12, 2012; U.S. Provisional Patent Application No. 61/609,698, titled "SYSTEM AND METHOD FOR PROVIDING AN ENTERPRISE CRAWL AND SEARCH FRAMEWORK", filed Mar. 12, 2012; U.S. Provisional Patent Application No. 61/621,405, titled "SYSTEM AND METHOD FOR PROVIDING AN ENTERPRISE CRAWL AND SEARCH FRAMEWORK", filed Apr. 6, 2012; U.S. Provisional Patent Application No. 61/659,843, titled "SYSTEM AND METHOD FOR PROVIDING AN ENTERPRISE CRAWL AND SEARCH FRAMEWORK USER INTERFACE", filed Jun. 14, 2012; and U.S. Provisional Patent Application No. 61/659,877, titled "SYSTEM AND METHOD FOR PROVIDING AN ENTERPRISE CRAWL AND SEARCH FRAMEWORK SECURITY", filed Jun. 14, 2012; each of which above applications is herein incorporated by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF INVENTION

Embodiments of the invention are generally related to enterprise applications, and to systems and methods for providing an enterprise crawl and search framework, including features such as use with middleware and enterprise application environments, pluggable security, search development tools, user interfaces, and governance.

BACKGROUND

Enterprise resource planning (ERP) or enterprise applications are commonly used by larger companies and organizations to run important aspects of their business. A typical enterprise application environment may include a database of business content, combined with end-user applications such as customer relationship management (CRM), human capital management (HCM), and business intelligence (BI).

Examples of such environments include Oracle E-Business Suite, and Oracle Fusion Applications, each of which is designed for handling complex business tasks within a large organization.

Organizations have become increasingly interested in greater integration of their business content with their business processes, including the use of transaction processing systems or application servers, such as Oracle WebLogic or Oracle Fusion Middleware, to deliver a higher quality of service in today's increasingly complex business environment. Such organizations can benefit from a richer search experience within their enterprise, which in turn requires rethinking traditional search methodologies. For example, since those company employees seeking particular information are also likely to have the best knowledge regarding their particular situation, it is important that they can obtain the information within that context. These are the general areas that embodiments of the invention are intended to address.

SUMMARY

In accordance with various embodiments, described herein are systems and methods for providing an enterprise crawl and search framework, including features such as use with middleware and enterprise application environments, pluggable security, search development tools, user interfaces, and governance.

As described herein, in accordance with an embodiment, the system includes an enterprise crawl and search framework which abstracts an underlying search engine, provides a common set of application programming interfaces for developing search functionalities, and allows the framework to serve as an integration layer between one or more enterprise search engines and one or more enterprise applications. A computing environment can be used to display a global universal search box. An application developer or other user can input search queries into the search box, which are then executed against crawled and/or searched data provided by the framework, and results, in the form of data represented by those searchable objects to which the user has entitlement to view, are returned dynamically, to update the contents of the search box.

DETAILED DESCRIPTION

Figure 1:
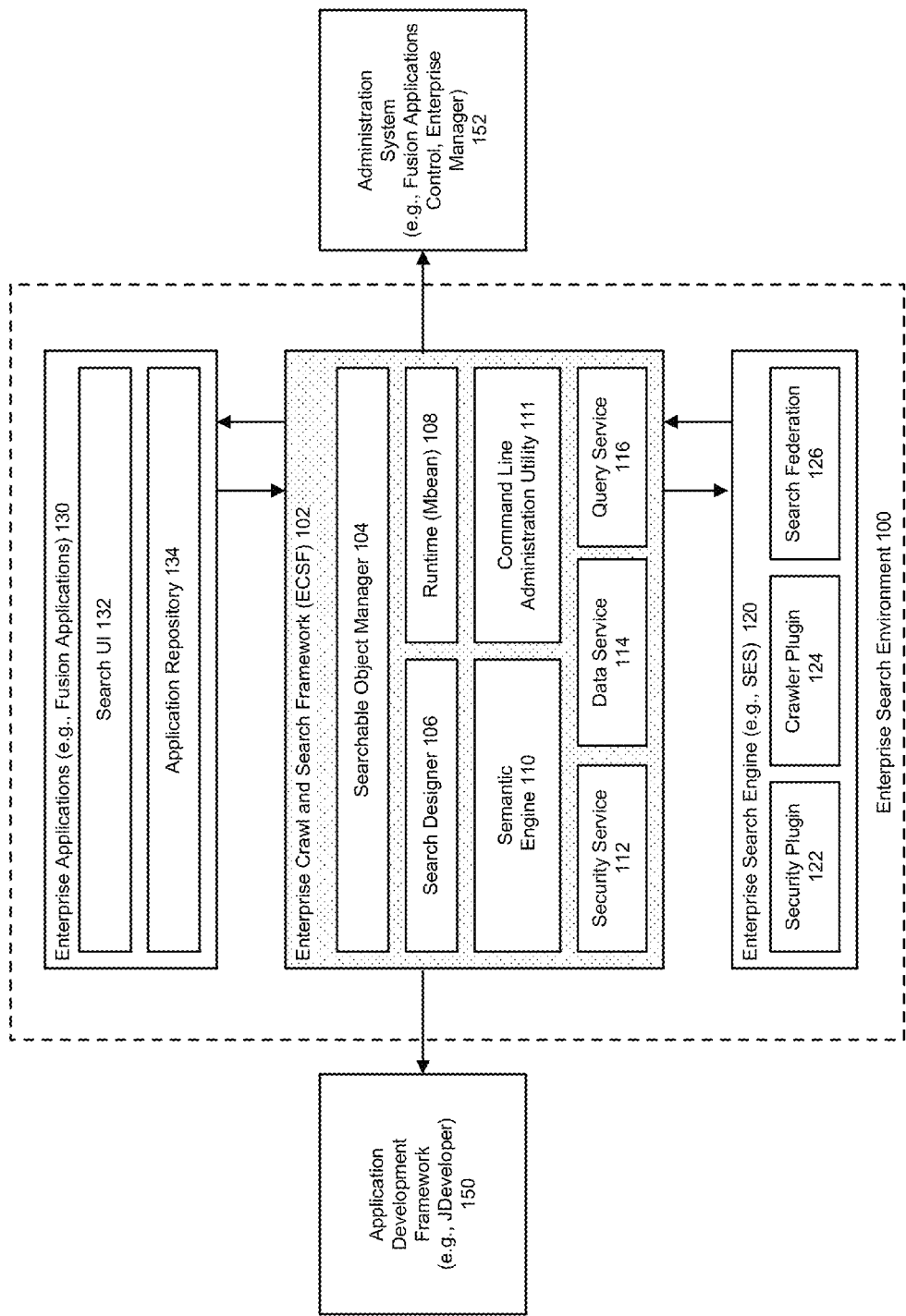
FIG. 1 illustrates an enterprise search environment including an enterprise crawl and search framework, in accordance with an embodiment.

As described above, organizations have become increasingly interested in greater integration of their business content with their business processes, including the use of transaction processing systems or application servers, to deliver a higher quality of service in today's increasingly complex business environment.

In particular, today's enterprise search specialists are looking to several important aspects of enterprise searching for use with their systems, including:

Visibility into the search engine process, which requires that the search engine not only log search activity, but also provide on-board reporting of user interaction.

Greater control of the search process, which enables information technology and business analysts to control and bias the search algorithm when necessary, including the use of relevance weightings for particular classes of content, and determining how host repositories should be indexed.

Improved delivery of search solutions to end-users, including the use of flexible templates for quickly building and rebuilding search experiences, and management dashboards that enable administrators to write and test business rules, relevance weighting profiles, and the indexing process.

Scalability in the search engine architecture, including the ability to scale the architecture using low-cost hardware.

Search engine security, including the ability to perform security checks in the search engine at runtime (when a set of results is queried), at index time (while the indexer crawls the data source), and/or upon a user's search query at execution time, to ensure the user see only that to which they are entitled.

To address this, in accordance with an embodiment, described herein are systems and methods for providing an enterprise crawl and search framework (ECSF), including features such as use with middleware and enterprise application environments, pluggable security, search development tools, user interfaces, and governance.

In accordance with an embodiment, the enterprise crawl and search framework can be used with environments such as Oracle Fusion Applications and/or Oracle WebLogic application server, or other enterprise application and computing environments, to consolidate business content information, and enable transactional search in a business context.

In accordance with an embodiment, the enterprise crawl and search framework includes an open architecture that supports different types of search engine in a plug-and-play manner, e.g., the use of Oracle Secure Enterprise Search (SES) or another open source or proprietary search engine. An administrator can add, define, configure and change search engines; define repositories to be supported; and administer external repositories, such as defining their location, defining and configuring connectors, indexing external data, and defining parameters related to federated search.

In accordance with an embodiment, the enterprise crawl and search framework can support features such as searching across different objects that have 1:1, 1:M, M:1 or M:M relationships with each other, as defined by the organization's business process; and the use of searchable objects, which allow users to control which objects can be exposed and made searchable.

In accordance with an embodiment which uses Fusion Applications, the enterprise crawl and search framework can be provided as part of an integrated environment that includes the framework itself; one or more search engines that provides the fundamental search capability that includes indexing, querying, and security; and a source system, such as a relational database, which stores searchable business content or other information.

In accordance with various embodiments described herein, some of the features and advantages of the enterprise crawl and search framework include:

Transparent integration of enterprise applications (e.g., Fusion Applications) with search engines, which minimizes development time and maximizes the user experience with search.

Code reuse, through the use of a well designed set of abstract classes, to reduce long design cycles.

Basic platform for developing search, which helps developers to grasp the conceptual flow of work easily.

Centralized process and control mechanism, which enhances search functionality.

Basic search functionality, which allows querying based on keyword and search categories.

Advanced search functionality, which allows querying based on keyword, search category, and attribute filters.

Faceted navigation, which allows filtering of search results based on attributes of business objects. For example, users can navigate a search result set based on a set of predefined facets, or dimensions; the system returns a list of facets and their associated set of available values with the search result; users can select a value for each facet, which is then submitted with the search query in order to narrow down the result set.

Actionable results, which are search results with action links associated with the searchable objects. From the search results, users can either go straight to the page displaying the record they selected, or they can invoke a specific task on a search result.

Saved searches, which allows saved search criteria for later use. Users can create new saved search entries, edit and delete existing saved search entries, and retrieve user-specified or public saved search entries.

File attachments, which allow the crawling of attachments associated with transactional objects or records, such as Fusion Applications transactional objects or records.

Crawling of searchable objects that contain appropriate tags.

Crawling of tree structures, which supports search functionality on those source systems which contain data organized in a tree structure (e.g., Oracle Business Intelligence).

Search support for external data sources, which allows querying against search groups that contain non-framework data sources, such as wiki pages and blogs, and which can be directly crawled by the search engine.

ECSF Architecture

FIG. 1 illustrates an enterprise search environment 100 including an enterprise crawl and search framework 102, in accordance with an embodiment. As shown in FIG. 1, in accordance with an embodiment, the framework abstracts an underlying search engine, and provides a common set of application programming interfaces (APIs) for developing search functionalities, which allows the framework to serve as an integration layer between one or more enterprise search engines 120 (e.g., SES), and one or more enterprise applications 130 (e.g., Fusion Applications).

In accordance with an embodiment, the enterprise crawl and search framework includes a searchable object manager component 104, a search designer component 106, a runtime (e.g., managed bean, Mbean) component 108, a semantic engine component 110, a command line administration utility component 111, and one or more security services, e.g., 112, data services, e.g., 114 and query services, e.g., 116. Each of the above components is described in further detail below.

In accordance with an embodiment, the enterprise crawl and search framework integrates with an enterprise search engine (e.g., SES), which provides capabilities for crawling and indexing metadata and objects exposed by the framework. In accordance with an embodiment, the enterprise search engine can include one or more security plugin components, e.g., 112, crawler plugin components, e.g., 124, and search federation components, e.g., 126. Each of the above components is also described in further detail below.

In accordance with an embodiment, each enterprise application can include a search user interface (UI) 132, and an application repository 134.

In accordance with an embodiment, the enterprise search environment including the enterprise crawl and search framework can be accessed by a developer or another user using an application development framework 150 (e.g., Oracle JDeveloper); and by an administrator or another user using an administration system 152 (e.g., Oracle Fusion Applications Control, or Oracle Enterprise Manager).

Searchable Object Manager

In accordance with an embodiment, the searchable object manager component serves as a metadata manager, manages searchable objects, and provides the runtime interface for accessing these objects. At runtime, the searchable object manager loads searchable objects from persistent storage, validates the searchable object definitions, and provides the searchable objects to a crawlable factory component of the data service. In accordance with an embodiment, the searchable object manager is also responsible for the lifecycle management of the searchable objects, which allows administrators to deploy, customize, and enable or disable searchable objects via the command line administration utility component, or the administration system.

Search Designer

In accordance with an embodiment, the search designer component can be provided, e.g., as a page in JDeveloper, including an interface for defining metadata that describes the business objects to be indexed. A developer or another user can use this design interface to specify the security mechanism to be used to protect the data, and to define the searchable object search characteristics, which include advanced search, faceted navigation, and actionable results.

Semantic Engine

In accordance with an embodiment, the semantic engine component leverages the semantic information of searchable object definitions to create context around the search, by interpreting searchable object definitions with relation to the runtime user information during both crawl and query time.

Administration System

In accordance with an embodiment, the administration system can be provided, e.g., as an Enterprise Manager extension that provides a user interface for registering searchable objects in the framework schema of, e.g., the Fusion Applications database, as well as for administering the runtime parameters of the framework, the target search engine, and the configuration of parameters.

Command Line Administration Utility

In accordance with an embodiment, the command line administration utility component is a standalone command line interface that provides a user interface for registering searchable objects in the framework schema of, e.g., the Fusion Applications database. A developer, administrator, or other user can also use the command line administration utility to configure and administer the framework without external dependencies on the administration system.

Security Service

In accordance with an embodiment, the security service component is responsible for providing security information to the search engine. During query time, the security service retrieves the security keys of the user performing the search, and passes those keys to the search engine, where they are used to filter the query results.

In accordance with an embodiment, the security service server component is also invoked during crawl time, to add security information (access control lists, ACL) to data before inserting or creating indexes on the search engine. An ACL identifies the users who can access an associated object, and specifies the user's access rights to that object. The ACL values generated by the security service during crawl time should match the corresponding keys generated during query time.

In accordance with an embodiment, the security service component is implemented as a security engine with a plug-in interface. The security plug-in determines the format of the ACL keys. For custom security models, a new/custom security plug-in can be implemented. In accordance with an embodiment, the security service can use, e.g., Oracle Platform Security for Java, to authenticate users and call the security plug-in to retrieve security values for a given searchable object.

Data Service

In accordance with an embodiment, the data service component is the primary data interface between the enterprise crawl and search framework and the search engine. In accordance with an embodiment, the data service can use a proprietary Really Simple Syndication (RSS) feed format. In addition to supporting the flow of metadata between the framework and the search engine, the data service can support attachments, batching, and error handling.

In accordance with an embodiment, the data service authenticates each search engine crawl request by using, e.g., Platform Security for Java, to validate the user credentials and permissions for crawling the data source. A crawlable factory component, which is part of the data service, determines how searchable objects are broken down, and manages the construction of RSS feeds to the search engine.

Query Service

In accordance with an embodiment, the query service component provides a search interface for the enterprise application's search user interface (UI), and handles all search requests. In accordance with an embodiment, the query service performs query rewrite, parameter substitution, and other preprocessing operations, before invoking the underlying configured search engine. Search results are also serviced via this service. Hooks can be provided to preprocess and postprocess data, which facilitates the capability to filter search results.

Search Engine

In accordance with an embodiment, the search engine component (e.g., SES) enables a secure, uniform search across multiple enterprise repositories. The enterprise crawl and search framework integrates with the search engine to provide full-text search functionality in enterprise applications (e.g., Fusion Applications).

Security Plug-In

Some search engines, such as SES, provide an API for writing security plug-ins or connectors, e.g., in Java, which allows a developer to provide a security plug-in to meet their requirements. In accordance with an embodiment, the enterprise crawl and search framework can interface with this security plug-in. The security plug-in invokes the security service to retrieve keys, to which the user has access, for filtering the results that are delivered to the query service. In accordance with an embodiment, a proxy user must be set up on the search engine in order to invoke the security service, and must have security privileges for the enterprise applications (e.g., Fusion Applications).

Crawler Plug-In

In accordance with an embodiment, the crawler plug-in component is a search engine module that implements the modified RSS feed format between the enterprise crawl and search framework and the search engine. In accordance with an embodiment, the crawler plug-in component deserializes data communicated by the framework, via the data service component, and interfaces with the search engine components that create the indexes.

Search Federation

In accordance with an embodiment, the search federation component provides support for the user of federated search engine instances.

Figure 2:
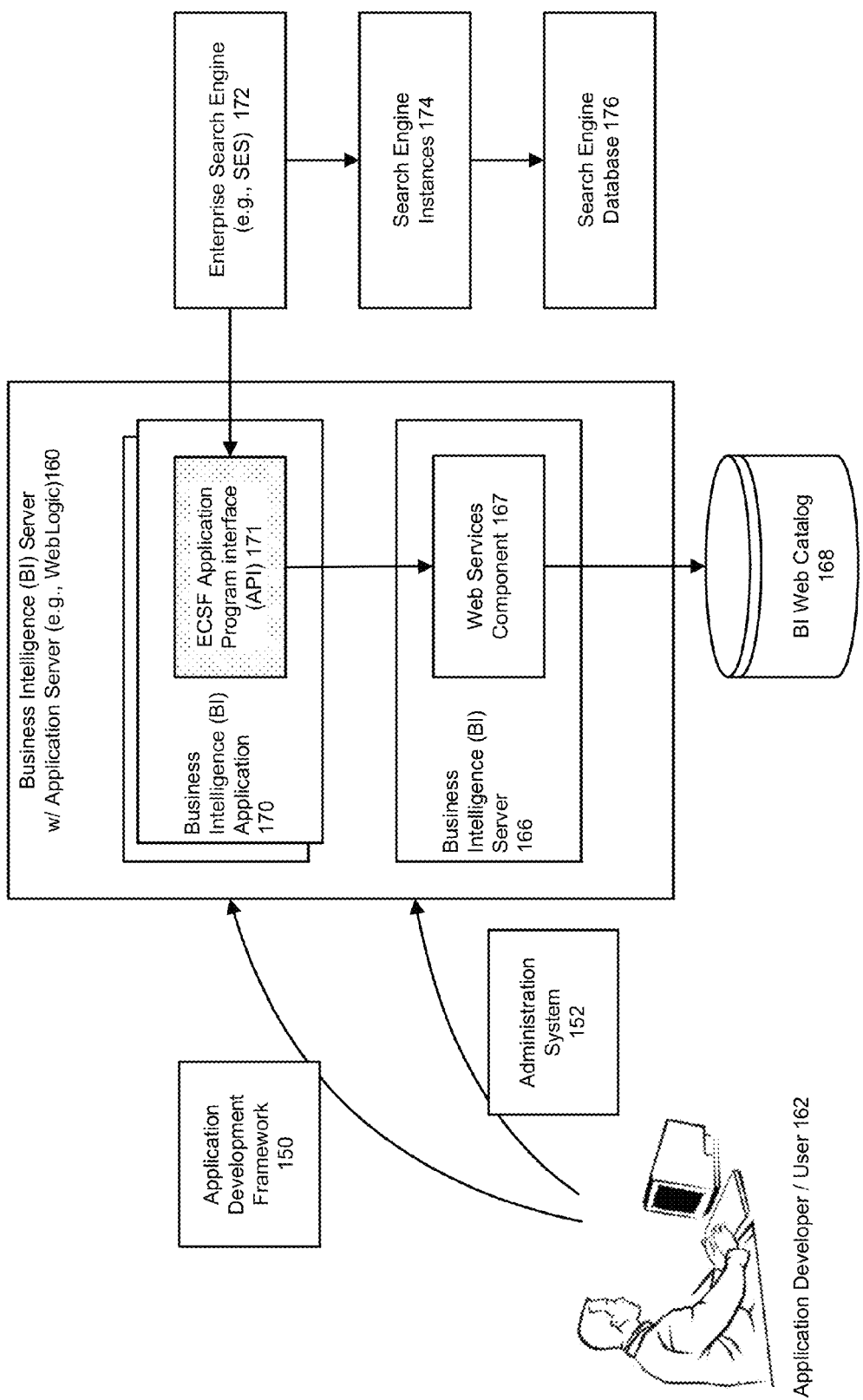
FIG. 2 illustrates an enterprise resource planning or enterprise application environment which includes an enterprise crawl and search framework, in accordance with an embodiment.

FIG. 2 illustrates an enterprise resource planning or enterprise application environment which includes an enterprise crawl and search framework, in accordance with an embodiment. It will be evident that the environment illustrated in FIG. 2 is provided merely as an illustrative example of the type of environment that can utilize various embodiments of the invention, and that, in accordance with other embodiments, different environments can be used.

As shown in FIG. 2, in accordance with an embodiment, a business intelligence (BI) server environment 160, such as an Oracle Business Intelligence environment using WebLogic application server, can include a BI server 166, and a web services component 167, that provides access to a BI web catalog of business content, data, or other information 172.

In accordance with an embodiment, one or more BI applications 170 can include an enterprise crawl and search framework API 171, which allows a developer or other user 162 using an application development framework and/or administration system, to configure the BI application(s) to take advantage of the enterprise crawl and search framework, including leveraging the enterprise search engine 172, search instances 174, and search engine database 176, to provide full-text search functionality across the applications.

Global Universal Search Box

In accordance with an embodiment, a system including the enterprise crawl and search framework can include support for a global universal search box.

Figure 3:
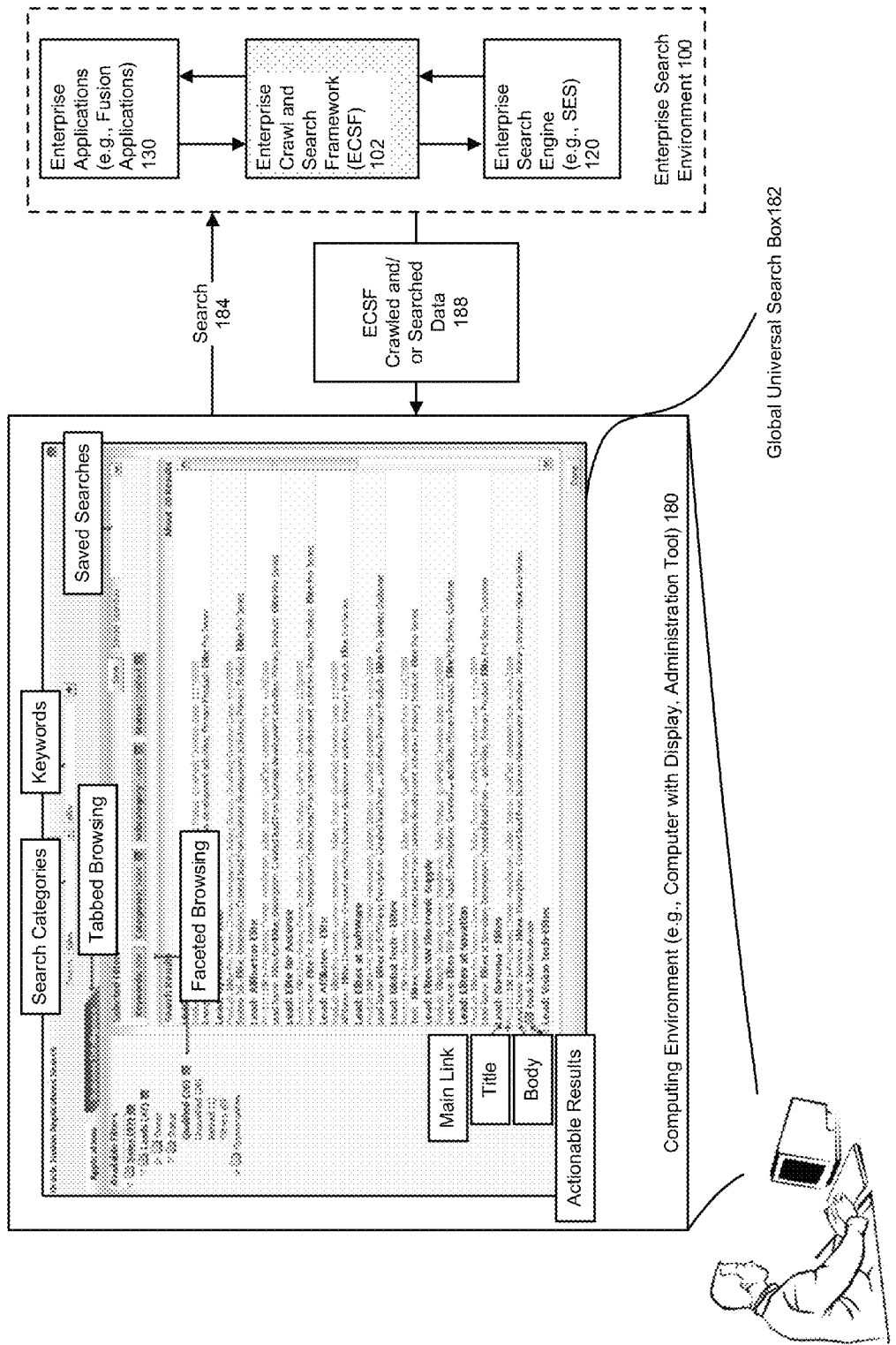
FIG. 3 illustrates a global universal search box, for use with an enterprise crawl and search framework, in accordance with an embodiment.

FIG. 3 illustrates a global universal search box, for use with an enterprise crawl and search framework, in accordance with an embodiment. As shown in FIG. 3, in accordance with an embodiment, a computing environment 180 (e.g., a computer with a display and an administration tool, such as a Fusion Applications Control or an Enterprise Manager interface), can be used to display a global universal search box 182.

In accordance with an embodiment, an application developer or other user can input search queries into the search box, which are then executed 184 against crawled and/or searched data provided by the enterprise crawl and search framework. Results, in the form of data represented by those searchable objects to which the user has entitlement to view, are returned dynamically 188, to update the contents of the search box. The user can then continue to make additional search queries, each time with the contents of the search box being dynamically updated based both on the most recently crawled and/or searched data provided by the framework, and on the user's entitlement.

In accordance with an embodiment, a "Search Categories" dropdown list allows enterprise application (e.g., Fusion Applications) users to scope their searches to one or more selected categories. In accordance with an embodiment, each search category corresponds to an enterprise search (e.g., SES) data source group. Search categories or data source groups are used for display purposes, and for organizing searchable objects.

In accordance with an embodiment, a "Keywords" field allows users to enter search terms or search engine-supported operators for use in performing a search.

In accordance with an embodiment, a "Tabbed Browsing" feature is used to organize search results for one or more enterprise applications (e.g., Fusion Applications, or Business Intelligence) into separate tabs, and allow the search box to federate queries to the appropriate search engine instances. For example, search results from a Fusion Applications SES instance can appear within a first or Fusion Applications tab; while search results from a Business Intelligence SES instance can appear within a second or Business Intelligence tab.

In accordance with an embodiment, a "Faceted Browsing" feature allows enterprise application users to filter their search results by selecting nodes in an "Available Filters" tree. Applied filters can be displayed in bold in the Available Filters tree, and as tiles in a "Selected Filters" region. In accordance with an embodiment, numbers displayed in parentheses next to the applied filters in the Available Filters tree represent the number of documents in the search result set that match that particular facet value. Users can then filter by category (e.g., by SES data source group), subcategory (e.g., by searchable object/SES data source), and values of one or more facets defined for a given subcategory. Filtering on a facet value automatically filters on its parent subcategory and category. Filters can be removed via delete icons in the Available Filters tree and the Selected Filters region. Removing a parent filter also removes all its children.

In accordance with an embodiment, a "Saved Searches" feature allows enterprise application users to save the searches they create. Saved searches comprise all of the characters in the Keywords field, and all of the filters the user has applied. Subsequently selecting a saved search runs the query and displays all filters in the Available Filters tree and the Selected Filters region.

In accordance with an embodiment, a "Main Link" feature identifies the object or page to which a search result item links. In accordance with an embodiment, the Main Link is the primary link and search result item title, as defined by a default action title by the applications developer.

In accordance with an embodiment, a "Title" provides key information about each search result item, in addition to the main link. In accordance with an embodiment, the title is part of the search result item's fixed content, and appears regardless of where the user's keywords match the searchable document.

In accordance with an embodiment, a "Body" of each search result item includes a context snippet that comprises one or more instances of the keywords, and the surrounding text extracted from the body of the searchable document.

In accordance with an embodiment, the "Actionable Results" are the list of the action links that appear below the body of each search result item. The action links allow enterprise application users to navigate directly to the pages for the objects represented by the search result items, so that they can take specific actions on those objects. Action links can also take the user to, e.g., third party web sites, or any page that can be accessed by a fully qualified uniform resource locator (URL).

A typical usage of the above-described global universal search box can by illustrated with the following example, based on a Fusion Applications environment:

Simone is a new sales representative at Cobalt Inc. a computer hardware company. She is taking over for Jim Anderson, who just left the company. Simone needs to learn about Jim's interactions with his customers and about how to sell Cobalt's new line of energy-saving displays.

Simone starts by entering "Jim Anderson" in the Fusion Applications Search box that is available at the top of every Fusion Applications page. Simone retrieves hundreds of documents pertaining to Jim Anderson and to people named "Jim" or "Anderson".

Simone is only interested in documents related to sales or customers, so she de-selects all the search categories except Sales and Customers and then re-runs her search. Now that Simone is only looking at potentially relevant records, she decides to start exploring the results for specific customers.

Simone expands the Customer Account node under the Customer node in the Available Filters tree to display a list of customer accounts. Simone can only view the search results for documents to which she has been granted access. Likewise, she can only view the search categories and filters to which she has access.

Simone clicks "ABC Corporation" to display only the records that involve both Jim Anderson and ABC Corporation. Simone hovers her mouse pointer over result items for Customer Notes and Customer Interactions to see the first 244 characters of each document. She drills down to view details for a note about the new energy-saving displays.

Simone continues to explore her search results. She filters the results by selecting new customers from the Customer Accounts node, views result items in the Search Results window, then drills into Fusion Applications to view details for interesting items.

Simone finds a particularly useful set of results by searching for the new energy-saving displays, then filtering for recent customer interactions. She decides to save her search so she can monitor customer interactions around the energy-saving displays, so she clicks the Save . . . button and names her search "Energy Saver Interactions". This enables her to re-run her search at any time from any page within Fusion Applications.

Thus, Simone reaps the benefits of the Fusion Applications Search feature that helps her tailor the search results to meet her specific business needs. She can also save the searches that she wants to reuse often.

The above-described example illustrates use within a Fusion Applications environment. In accordance with other embodiments, a similar process of using a search box can be used within other enterprise application environments.

Figure 4:
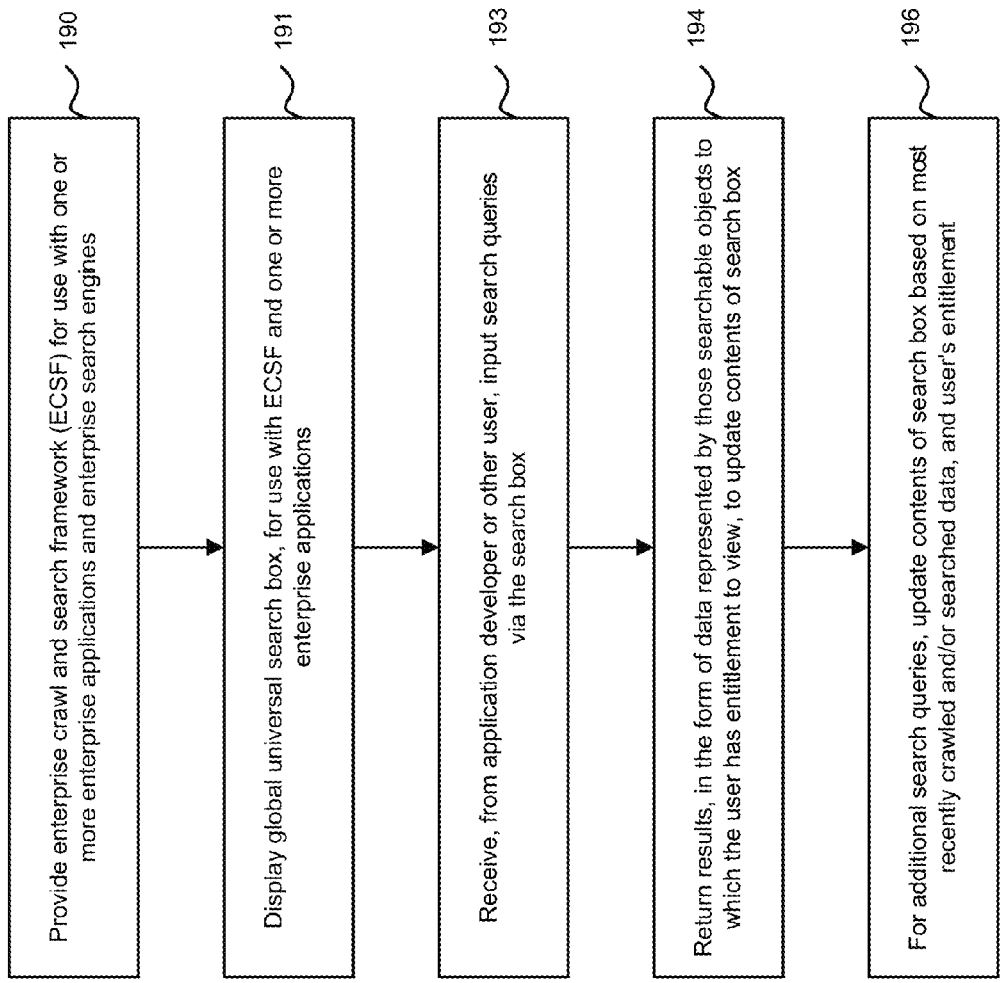
FIG. 4 illustrates a method of providing a global universal search box, in accordance with an embodiment.

FIG. 4 illustrates a method of providing a global universal search box, in accordance with an embodiment. As shown in FIG. 4, in accordance with an embodiment, at step 190, an enterprise crawl and search framework (ECSF) is provided for use with one or more enterprise applications (e.g., Fusion Applications) and enterprise search engines (e.g., SES).

At step 191, a global universal search box is displayed for use with the enterprise applications.

At step 193, an application developer or other user can input search queries into the search box, which are then executed against crawled and/or searched data provided by the enterprise crawl and search framework.

At step 194, results, in the form of data represented by those searchable objects to which the user has entitlement to view, are returned dynamically, to update the contents of the search box.

At step 196, the user can make additional search queries, each time with the contents of the search box being dynamically updated, based both on the most recently crawled and/or searched data provided by the framework, and on the user's entitlement.

In accordance with an embodiment, it is anticipated that an application developer or other user may wish to develop additional search box user interfaces or implementations, e.g., for use with different enterprise applications. To this end, in accordance with an embodiment, a sample user interface page can be provided to assist the application developer or other user to create new search box user interfaces or implementations.

Figure 5:
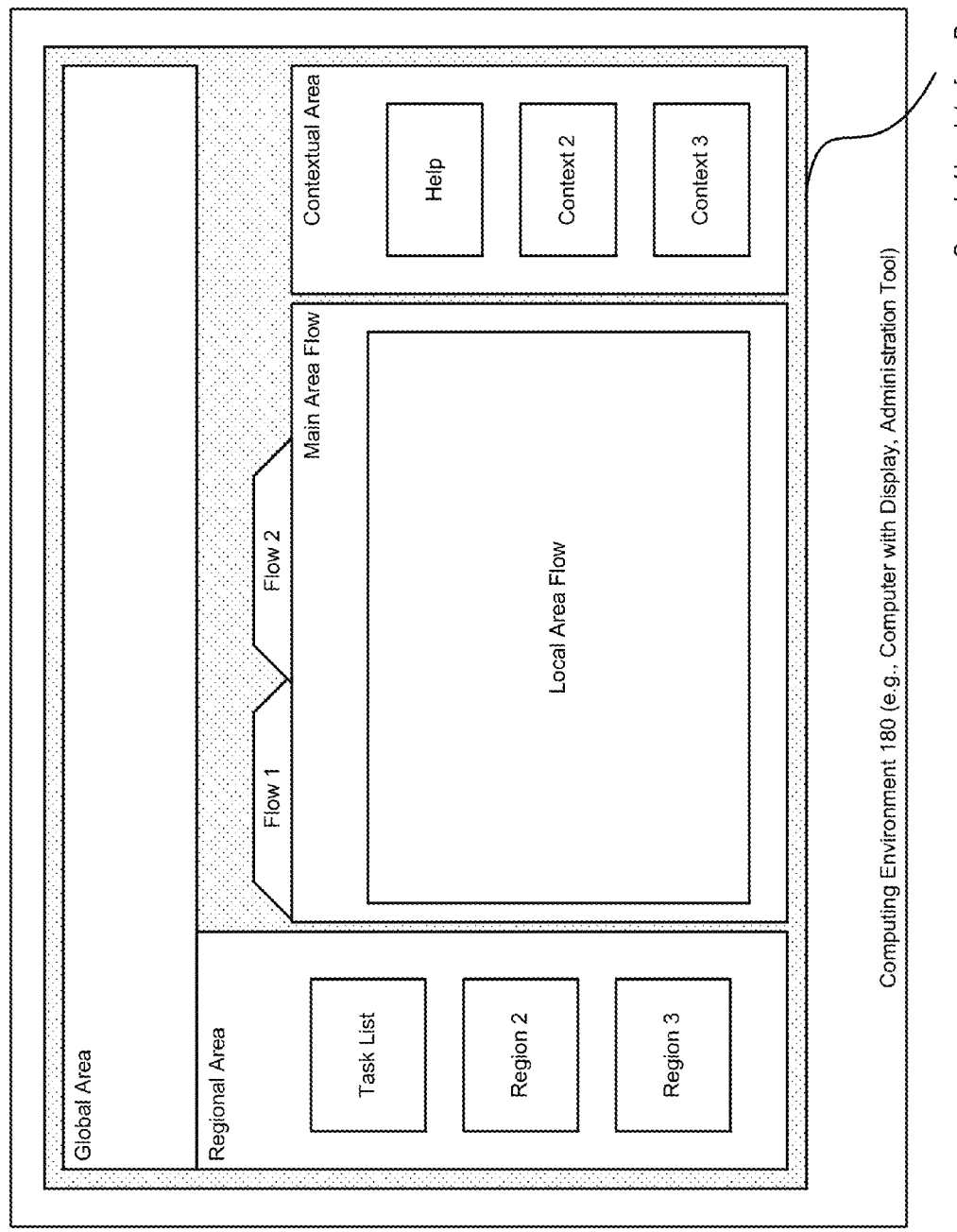
FIG. 5 illustrates the use of a sample user interface page, in accordance with an embodiment.

FIG. 5 illustrates the use of a sample user interface page, in accordance with an embodiment. As shown in FIG. 5, in accordance with an embodiment, a sample user interface (UI) page 198 provides the application developer or other user with a reference that can be used to guide the process of creating custom user interfaces. In accordance with an embodiment, use of the sample UI page can dramatically improve search application development, by providing not only a learning tool for application developers with little or no experience to become productive quickly, but also by providing a fully functional starting point based for developing enterprise search.

In accordance with an embodiment, the sample UI page describes the search runtime ECSF feature located on application pages. The sample UI search facility can be used to search for a single business object or several related business objects, and can also serve as a starting point for developers to test exposed ECSF functionality in their enterprise search application.

In accordance with an embodiment, the sample UI page can be used by a developer as a basis for building complex search UI's for use with enterprise application, including:

Focused Search, which can be simple, quick search UI's, or more complex, fielded search UI's.

Transactional Search, which provides real-time search of transactional tables. Transactional search can be contrasted with indexed data search facilities, such as those driven by Oracle Text or SES, in which the search indexes are refreshed periodically, and consequently, indexed data search results may not be fully up to date.

Global Search, which uses a simple UI and is suite-scoped by default, provides a search of a crawled index, and can be made to appear in the Global Area of every page.

The above-described examples of search types are provided for purposes of illustration. In accordance with other embodiments, other types of search can also be provided.

The present invention may be conveniently implemented using one or more conventional general purpose or specialized digital computer, computing device, machine, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

In some embodiments, the present invention includes a computer program product which is a non-transitory storage medium or computer readable medium (media) having instructions stored thereon/in which can be used to program a computer to perform any of the processes of the present invention. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

The foregoing description of the present invention has been provided for the purposes of illustration and description. It is not intended to be exhaustive or to limit the invention to the precise forms disclosed. Many modifications and variations will be apparent to the practitioner skilled in the art.

In particular, it will be evident that, although many of the examples described above illustrate the use of an enterprise crawl and search framework within an environment that includes an Oracle Fusion Applications enterprise application, and an Oracle Secure Enterprise Search enterprise search engine, in accordance with various embodiments, the enterprise crawl and search framework, and features and methods described can be used with other types of enterprise application, and other types of enterprise search engine.

The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

What is claimed is:

1. A system including an enterprise crawl and search framework (ECSF) which includes support for a global universal search box, comprising:
a computer including one or more microprocessors;
an ECSF framework, executing on the computer, which abstracts an underlying search engine and provides a common set of application programming interfaces (APIs) for developing search functionalities,
wherein the ECSF framework is configured to serve as an integration layer between one or more enterprise search engines and one or more enterprise applications,
wherein the ECSF framework includes a searchable object manager configured to manage searchable objects from the one or more enterprise applications and provide a runtime interface for accessing the searchable objects; and
a computing environment which displays a global universal search box;
wherein when a user inputs a search query into the global universal search box, the search query is executed against crawled and/or searched data provided by the ECSF framework; and
wherein results of the search query, in the form of data represented by the searchable objects to which the user has entitlement to view, are returned dynamically, to update contents of the global universal search box.

2. The system of claim 1, wherein the user makes additional search queries, in response to which each time the contents of the global universal search box are dynamically updated based both on the most recently crawled and/or searched data provided by the framework, and on the user's entitlement.

3. The system of claim 1, wherein the global universal search box includes faceted browsing that configures enterprise application users to filter their search results by selecting nodes in an available filters tree, and wherein numbers next to the applied filters in the available filters tree represent the number of documents in the search result set that have that particular facet value.

4. The system of claim 1, wherein the system includes a sample user interface page that provides the user with a reference used to guide the process of creating custom user interfaces.

5. The system of claim 1, wherein the enterprise search engine is an Oracle Secure Enterprise Search engine, and wherein the enterprise application is Oracle Fusion Applications.

6. A method for use with an enterprise crawl and search framework (ECSF), for providing support for a global universal search box, comprising the steps of:
providing an ECSF framework which abstracts an underlying search engine and provides a common set of application programming interfaces (APIs) for developing search functionalities,
wherein the ECSF framework is configured to serve as an integration layer between one or more enterprise search engines and one or more enterprise applications,
wherein the ECSF framework includes a searchable object manager configured to manage searchable objects from the one or more enterprise applications and provide a runtime interface for accessing the searchable objects; and
providing a computing environment which displays a global universal search box;
wherein when a user inputs a search query into the global universal search box, the search query is executed against crawled and/or searched data provided by the ECSF framework; and
wherein results of the search query, in the form of data represented by the searchable objects to which the user has entitlement to view, are returned dynamically, to update contents of the global universal search box.

7. The method of claim 6, wherein the user makes additional search queries, in response to which each time the contents of the global universal search box are dynamically updated based both on the most recently crawled and/or searched data provided by the framework, and on the user's entitlement.

8. The method of claim 6, wherein the global universal search box includes faceted browsing that configures enterprise application users to filter their search results by selecting nodes in an available filters tree, and wherein numbers next to the applied filters in the available filters tree represent the number of documents in the search result set that have that particular facet value.

9. The method of claim 6, wherein the system includes a sample user interface page that provides the user with a reference that can be used to guide the process of creating custom user interfaces.

10. The method of claim 6, wherein the enterprise search engine is an Oracle Secure Enterprise Search engine, and wherein the enterprise application is Oracle Fusion Applications.

11. A non-transitory computer readable storage medium, including instructions stored thereon, which when read and executed by a computer cause the computer to perform the steps comprising:
providing an ECSF framework which abstracts an underlying search engine and provides a common set of application programming interfaces (APIs) for developing search functionalities,
wherein the ECSF framework is configured to serve as an integration layer between one or more enterprise search engines and one or more enterprise applications,
wherein the ECSF framework includes a searchable object manager configured to manage searchable objects from the one or more enterprise applications and provide a runtime interface for accessing the searchable objects; and
providing a computing environment which displays a global universal search box;
wherein when a user inputs a search query into the global universal search box, the search query is executed against crawled and/or searched data provided by the ECSF framework; and
wherein results of the search query, in the form of data represented by the searchable objects to which the user has entitlement to view, are returned dynamically, to update contents of the global universal search box.

12. The non-transitory computer readable storage medium of claim 11, wherein the user makes additional search queries, in response to which each time the contents of the global universal search box are dynamically updated based both on the most recently crawled and/or searched data provided by the framework, and on the user's entitlement.

13. The non-transitory computer readable storage medium of claim 11, wherein the global universal search box includes faceted browsing that configures enterprise application users to filter their search results by selecting nodes in an available filters tree, and wherein numbers next to the applied filters in the available filters tree represent the number of documents in the search result set that have that particular facet value.

14. The non-transitory computer readable storage medium of claim 11, wherein the system includes a sample user interface page that provides the user with a reference that can be used to guide the process of creating custom user interfaces.

15. The non-transitory computer readable storage medium of claim 11, wherein the enterprise search engine is an Oracle Secure Enterprise Search engine, and wherein the enterprise application is Oracle Fusion Applications.

\* \* \* \* \*